US008588764B1

(12) United States Patent
Koller et al.

(10) Patent No.: US 8,588,764 B1
(45) Date of Patent: Nov. 19, 2013

(54) WIRELESS NETWORK EDGE GUARDIAN

(75) Inventors: Gary D. Koller, Overland Park, KS (US); Mark D. Peden, Olathe, KS (US); Raymond E. Reeves, Olathe, KS (US); Simon Youngs, Overland Park, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 24 days.

(21) Appl. No.: 13/359,311

(22) Filed: Jan. 26, 2012

(51) Int. Cl.
*H04W 24/00* (2009.01)

(52) U.S. Cl.
USPC ........ 455/423; 455/405; 455/412.2; 455/410; 455/466; 726/22

(58) Field of Classification Search
USPC .............. 455/405, 423, 403, 412.2, 466, 410; 726/22
See application file for complete search history.

(56) References Cited

U.S. PATENT DOCUMENTS

| | | | | |
|---|---|---|---|---|
| 6,055,433 | A * | 4/2000 | Yuan et al. | 455/453 |
| 6,912,574 | B2 * | 6/2005 | Scifres et al. | 709/224 |
| 7,293,201 | B2 | 11/2007 | Ansari | |
| 7,693,876 | B2 * | 4/2010 | Hackworth et al. | 709/224 |
| 7,797,343 | B2 * | 9/2010 | Morain et al. | 707/791 |
| 8,406,756 | B1 * | 3/2013 | Reeves et al. | 455/432.1 |
| 8,422,988 | B1 * | 4/2013 | Keshav | 455/405 |
| 2002/0072359 | A1 | 6/2002 | Moles et al. | |
| 2003/0027580 | A1 * | 2/2003 | Goodjohn et al. | 455/453 |
| 2003/0139905 | A1 * | 7/2003 | Helsper et al. | 702/182 |
| 2004/0203755 | A1 | 10/2004 | Brunet et al. | |
| 2004/0218602 | A1 * | 11/2004 | Hrastar | 370/390 |
| 2005/0055426 | A1 * | 3/2005 | Smith et al. | 709/219 |
| 2005/0107107 | A1 * | 5/2005 | Shahidi et al. | 455/522 |
| 2005/0262563 | A1 * | 11/2005 | Mahone et al. | 726/22 |
| 2006/0223495 | A1 * | 10/2006 | Cassett et al. | 455/405 |
| 2006/0234698 | A1 | 10/2006 | Fok et al. | |
| 2007/0180521 | A1 * | 8/2007 | Malkin et al. | 726/22 |
| 2007/0206546 | A1 * | 9/2007 | Alberth et al. | 370/338 |
| 2007/0207800 | A1 | 9/2007 | Daley et al. | |
| 2008/0214186 | A1 | 9/2008 | Bizzarri et al. | |
| 2008/0274716 | A1 | 11/2008 | Fok et al. | |
| 2008/0288946 | A1 * | 11/2008 | Richards et al. | 718/103 |
| 2008/0301295 | A1 * | 12/2008 | Malkin et al. | 709/224 |
| 2009/0049544 | A1 * | 2/2009 | Kashi | 726/19 |
| 2009/0213871 | A1 * | 8/2009 | Carlson et al. | 370/462 |

(Continued)

OTHER PUBLICATIONS

App of the Day—3G Watchdog (Android)—Dan Sung—Pocket-lint, May 26, 2010.*

(Continued)

*Primary Examiner* — Kamran Afshar
*Assistant Examiner* — Mong-Thuy Tran (57) ABSTRACT

A mobile communication device. The mobile communication device comprises a radio transceiver to communicatively couple the mobile communication device to a radio access network by a wireless communication link, a memory, a processor, and an application stored in the memory. When executed by the processor, the application builds a communication history of the mobile communication device, analyzes the communication history of the mobile communication device to determine a pattern of communication usage of the mobile communication device, monitors recent communication usage of the mobile communication device, compares the recent communication usage of the mobile communication device to the pattern of communication usage of the mobile communication device, and when the recent communication usage of the mobile communication device differs from the pattern of communication usage of the mobile communication device by more than a predefined threshold, blocks at least one attempt to initiate communication by the mobile communication device.

17 Claims, 7 Drawing Sheets

(56) References Cited

U.S. PATENT DOCUMENTS

| | | | |
|---|---|---|---|
| 2009/0288144 A1* | 11/2009 | Huber et al. | 726/3 |
| 2010/0195503 A1* | 8/2010 | Raleigh | 370/235 |
| 2010/0235918 A1* | 9/2010 | Mizrahi et al. | 726/25 |
| 2010/0281155 A1 | 11/2010 | Cipollone et al. | |
| 2010/0330954 A1* | 12/2010 | Manning Cassett et al. | 455/405 |
| 2011/0098018 A1* | 4/2011 | Engel | 455/406 |
| 2011/0161484 A1* | 6/2011 | Van den Bogaert et al. | 709/224 |
| 2011/0199934 A1* | 8/2011 | Olofsson et al. | 370/252 |
| 2011/0213865 A1* | 9/2011 | Durazzo et al. | 709/220 |
| 2011/0280130 A1* | 11/2011 | Foottit et al. | 370/236 |
| 2011/0320607 A1* | 12/2011 | Harrang et al. | 709/226 |
| 2012/0084184 A1* | 4/2012 | Raleigh et al. | 705/30 |
| 2012/0101952 A1* | 4/2012 | Raleigh et al. | 705/304 |
| 2012/0102191 A1* | 4/2012 | Rabii | 709/224 |
| 2012/0108225 A1* | 5/2012 | Luna et al. | 455/418 |
| 2012/0115433 A1* | 5/2012 | Young et al. | 455/406 |
| 2012/0117478 A1* | 5/2012 | Vadde et al. | 715/736 |
| 2012/0196543 A1* | 8/2012 | Andersson et al. | 455/67.11 |
| 2012/0221955 A1* | 8/2012 | Raleigh et al. | 715/736 |
| 2012/0252357 A1* | 10/2012 | Tarleton et al. | 455/26.1 |
| 2013/0007245 A1* | 1/2013 | Malik et al. | 709/223 |
| 2013/0018965 A1* | 1/2013 | Ramachandran et al. | 709/206 |
| 2013/0023230 A9* | 1/2013 | Momtahan et al. | 455/405 |
| 2013/0031599 A1* | 1/2013 | Luna et al. | 726/1 |
| 2013/0036450 A1* | 2/2013 | Kim et al. | 726/3 |

OTHER PUBLICATIONS

Gailloux, Michael A., et al., Patent Application entitled, "Customer Initiated Mobile Diagnostics Service" filed Dec. 2, 2009, U.S. Appl. No. 12/629,860.

Contino, Jeff, et al., Patent Application entitled, "Application Risk Analysis", filed Nov. 19, 2012, U.S. Appl. No. 13/681,337.

Contino, Jeff, et al., Patent Application entitled, "Evaluation of Mobile Device State and Performance Metrics for Diagnosis and Troubleshooting of Performance Issues", filed Oct. 18, 2012, U.S. Appl. No. 13/655,333.

Pre-Interview Communication dated Oct. 2, 2012, U.S. Appl. No. 12/629,860, filed Dec. 2, 2009.

FAIPP Office Action dated Dec. 7, 2012, U.S. Appl. No. 12/629,860, filed Dec. 2, 2009.

Final Office Action dated Apr. 9, 2013, U.S. Appl. No. 12/629,860, filed Dec. 2, 2009.

Advisory Action dated Jun. 6, 2013, U.S. Appl. No. 12/629,860, filed Dec. 2, 2009.

* cited by examiner

WIRELESS NETWORK EDGE GUARDIAN

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Mobile communication devices are becoming increasingly intertwined with our daily lives. Recently communication devices have begun to support installation of third party applications onto the communication device to provide new functionalities. A wide variety of third party applications are available, and new third party applications are developed and brought into the user community all the time. By the nature of the development and distribution model of third party applications, the manufacturer of the mobile communication devices and/or the provider of wireless communication services may not test the execution of these third party applications in the environment provided by the mobile communication device hardware, firmware, and/or software originally delivered. A third party application may have undetected bugs and/or may interact in an undesirable manner with the mobile communication device as originally delivered. The behavior of third party applications and their impact on the user experience may have implications for user satisfaction with the mobile communication device and or the wireless communication service.

SUMMARY

In an embodiment, a mobile communication device is disclosed. The mobile communication device comprises a radio transceiver to communicatively couple the mobile communication device to a radio access network by a wireless communication link, a memory, a processor, and an application stored in the memory. When executed by the processor, the application builds a communication history of the mobile communication device, analyzes the communication history of the mobile communication device to determine a pattern of communication usage of the mobile communication device, monitors recent communication usage of the mobile communication device, compares the recent communication usage of the mobile communication device to the pattern of communication usage of the mobile communication device, and when the recent communication usage of the mobile communication device differs from the pattern of communication usage of the mobile communication device by more than a predefined threshold, blocks at least one attempt to initiate communication by the mobile communication device.

In an embodiment, a method of managing a radio access network is disclosed. The method comprises monitoring communications between mobile communication devices and a radio access network, based on monitoring communications between mobile communication devices and the radio access network, determining a usage pattern of the radio access network, and determining that recent usage by mobile communication devices of at least part of the radio access network differs from the usage pattern of the radio access network by an amount that exceeds a predetermined threshold. The method further comprises, based on recent radio access network usage differing from the usage pattern of the radio access network by an amount exceeding the predetermined threshold, transmitting a message to a mobile communication device via the radio access network, wherein the message requests the mobile communication device to modify a communication activity of the mobile communication device.

In an embodiment, a method of managing a radio access network is disclosed. The method comprises receiving messages from a first plurality of mobile communication devices via the radio access network, each message identifying an abnormal communication usage of one of the first plurality of mobile communication devices, analyzing the received messages, and based on the analysis of the received messages, transmitting a message to each of a second plurality of mobile communication devices via the radio access network, wherein the message requests modification of communication activity of the mobile communication devices and wherein at least some of the second plurality of mobile communication devices do not belong to the first plurality of mobile communication devices.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

Problems may be caused by mobile communication devices that interfere with the proper operation of wireless access networks—for example the ability of mobile phones to place phone calls or to place data calls. The problems may result from software bugs in the mobile communication devices. For example, third party applications that a user purchases from an on-line store and install in his or her mobile phone may not be properly tested and may exhibit such interfering behavior. Because wireless communication service providers do not have much control over such third party applications, there is little the service provider can do to assure the reliability of such third party applications. The present disclosure teaches a system and method for proactively monitoring communications behavior and throttling or halting communications of the mobile communication device under predefined circumstances.

For example, a mobile communication device may accumulate data characterizing its communication usage, perform statistical analysis of that data, and use the statistical results to detect when its own communication usage exceeds its communication norms by a predefined amount. For example, if the mobile communication device normally sends short message service (SMS or 'text') messages addressed to no more than four addresses, when the device detects that a text message addressed to 100 recipients is queued to be transmitted, a monitoring application make take proactive action. When abnormal behavior is detected the mobile communication device can take a variety of proactive steps to respond to the abnormal behavior. For example, the mobile communication device may halt or pause an in-progress communication activity and pop-up a dialog box notifying the user of the anomalous behavior and asking the user to approve completion of the paused communication activity. Alternatively, the mobile communication device may terminate the in-progress communication activity, send a message to a corresponding monitoring server in the wireless service provider network describing the abnormal communication usage and then turn off the mobile communication device.

As another example, an application executing on a server in a wireless communication service provider's network may determine wireless communication usage norms, monitor divergence of mobile communication device wireless communication usage from those usage norms, and take action to prevent and/or attenuate degradation of wireless access. For example, if the server application determines that an abnormal communication usage is occurring, it may send messages to mobile devices to shut off all non-trusted applications, to shut off all third party applications, to shut off short message service functionality, or shut off some other functionality. Alternatively, the server application may be notified by one or more mobile communication devices that have self-detected their own abnormal communication usage and have sent a message reporting the same to the server. In response, the server may send a message to these mobile devices instructing them to selectively disable or turn off associated communication applications. Additionally, the server may send a message to other mobile communication devices to take action to avoid the identified problem, for example other mobile communication devices of the same model or type of device, other mobile communication devices having the same third party application installed, or based on some other shared communication characteristic.

Figure 1:
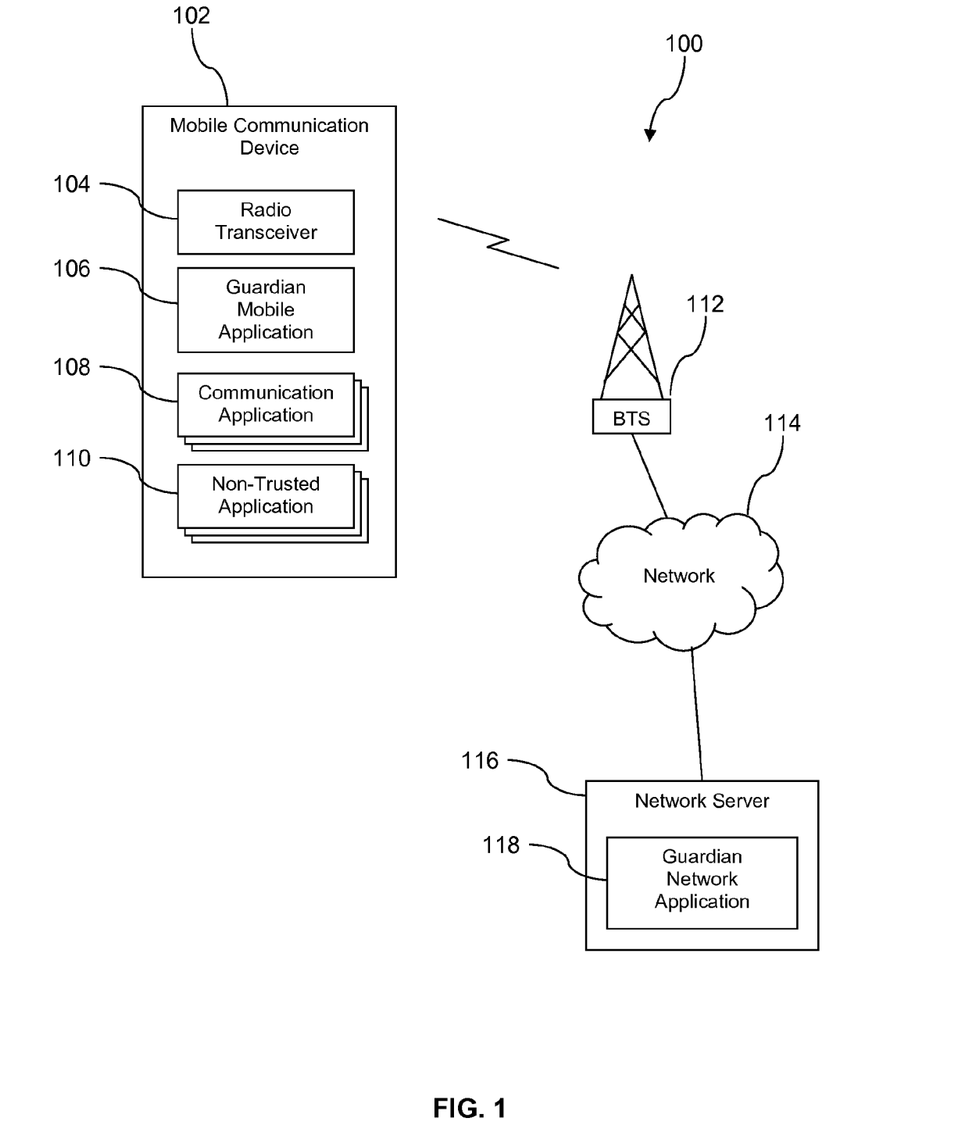
FIG. 1 is an illustration of a communication system according to an embodiment of the disclosure.

Turning now to FIG. 1, a communication system 100 is described. In an embodiment, the system 100 comprises a plurality of mobile communication devices 102. The device 102 may comprise a radio transceiver 104, a guardian mobile application 106, a plurality of communication applications 108, and one or more non-trusted applications 110. The device 102 is configured to use the radio transceiver 104 to establish a wireless communication link with a base transceiver station (BTS) 112, and the base transceiver station 112 provides communications connectivity of the device 102 to a network 114. The network may comprise any combination of private and public networks.

It is understood that the system 100 may comprise any number of mobile communication devices 102 and any number of base transceiver stations 112. The collectivity of base transceiver stations 112 may be said to comprise a radio access network, in that these base transceiver stations 112 may provide a radio communication links to the mobile communication devices 102 to provide access to the network 114. The radio access network may be abstracted in different ways and may comprise, in addition to the base transceiver stations 112, servers and data stores such as home location registers (HLRs) or servers that implement the functionality of home location registers, visitor location registers (VLRs) or servers that implement the functionality of visitor location registers, base station controllers (BSCs), mobile switching centers (MSCs), and other network nodes that are specifically associated with providing wireless access and connectivity to the mobile communication devices 102.

The radio transceiver 104 may communication with the base transceiver station 112 using any of a variety of wireless communication protocols including a code division multiple access (CDMA) wireless communication protocol, a global system for mobile communication (GSM) wireless communication protocol, a long-term evolution (LTE) wireless communication protocol, a world-wide interoperability for microwave access (WiMAX) wireless communication protocol, or another wireless communication protocol. The device 102 may be any of a mobile phone, a personal digital assistant (PDA), a media player, a wireless enabled computer, or other mobile communication device. In an embodiment, the mobile communication device 102 may have other components (not shown) such as a near field communication (NFC) radio transceiver, a wireless local area network (WLAN) radio transceiver, or other components.

The communication applications 108 may comprise a voice communication application, a data communication application, a web browser application, an email application, a short message system (SMS) or texting application, a multimedia message system (MMS) application, and other communication applications. The communication applications 108 may be standard communication applications that are delivered by an original equipment manufacturer (OEM) who assembles the mobile communication device 102. The communication applications 108 may be stored as firmware or software in a trusted memory area of the mobile communication device 102. The communication applications 108 may expose application programming interfaces (APIs) accessible to other applications, for example to non-trusted applications 110, to provide wireless communication functionality to the other applications.

The non-trusted applications 110 may be applications that are installed on the mobile communication device 102 by a user, for example after the mobile communication device 102 is sold to the user. The non-trusted applications 110 may be provided by third party developers who may not be subject to design and/or quality control standards defined by the wireless service provider. The non-trusted applications 110 may be freeware applications and may be of dubious integrity or reliability. As such, the non-trusted applications 110 may have the potential to interfere with the normal operation of the radio access network, for example, to interfere with the mobile communication devices 102 establishing a wireless link with the base transceiver stations 112. The non-trusted applications 110 may interfere with normal operations or the radio access network either by accident, for example as a result of a poor design or coding errors, or by malicious intent, for example as a result of a malware incorporated in one of the non-trusted applications 110. Typical network security architectures are based on establishing a point of demarcation between "outside" and "inside" the network and protect the inside of the network with a firewall. Typically the firewall is located somewhere within the network cloud 114 illustrated in FIG. 1 and may provide limited or no protection to the radio access network. For example, the firewall is typically not located between the base transceiver stations 112 and the mobile communication devices 102, and hence cannot secure the base transceiver stations 112 from problems associated with the physical (PHY) layer radio signals.

In an embodiment, the guardian mobile application 106 monitors the behavior of the communication applications 108 and takes action to reduce the risk that the mobile communication device 102 may interfere with normal operation of the radio access network. In an embodiment, the guardian mobile application 106 receives and acts on requests to adapt the communication usage of the mobile communication device 102, for example requests from a guardian network application 118 executing on a network server 116 that is coupled to the network 114. The guardian mobile application 106 may be able to inhibit, pause, and/or shut-down one or more of the communication applications 108. The guardian mobile application 106 may be able to inhibit, pause, and/or shut-down one or more of the non-trusted applications 110. The guardian mobile application 106 may also send messages and/or reports to the guardian network application 118, for example providing communication statistics and/or communication metrics associated with the communication usage of the subject mobile communication device 102. The guardian mobile application 106 may send a message to the guardian network application 118 identifying a particular anomalous communication usage or communication usage of the mobile communication device 102 that the guardian mobile application 106 has detected.

The guardian mobile application 106 may collect a variety of data about the use of the communication applications 108. In some contexts, this collection of data may be referred to as a communication history of the mobile communication device 102. For example, the guardian mobile application 106 may store logs of communication activities such as voice call records, data call records, browser sessions, short message service messages or texts. Alternatively, the communication applications 108 may themselves generate logs of their activities, and these logs of communication activities may be accessible to the guardian mobile application 106.

The guardian mobile application 106 may statistically analyze the communication activities of the mobile communication device 102 to determine communication norms, communication means, communication averages, or other communication usage expectations. In some contexts, the results of this analysis may be referred to as a pattern of communication usage or a communication usage pattern. For example, the guardian mobile application 106 may determine a mean or average frequency of sending short message service messages by the mobile communication device 102. The unit time interval of the frequency may be any time interval, for example a hour time interval, a day time interval, or some other time interval. For example the mean frequency or average frequency of sending text messages may be expressed as texts per hour or texts per day. The guardian mobile application 106 may determine a mean or average number of addressees in text messages and/or email messages. The guardian mobile application 106 may also determine a standard deviation from the mean or average associated with one or more of the communication activities.

The guardian mobile application 106 may determine the statistical means and averages and associated standard deviations over a recent window of time, for example based on logs accumulated over the most recent seven days, over the most recent 30 days, over the most recent three months, or some other time interval. The guardian mobile application 106 may recalculate or re-determine the statistical means and averages and associated standard deviations periodically, for example every day, every week, every month, or some other period of time. Note that the period of time over which data is collected for determining norms and standard deviations may be different from the period of time when norms and standard deviations are redetermined or recalculated. For example, the norms may be determined using data collected over the last month, and these norms may be determined every day.

In an embodiment, the guardian mobile application 106 may compare current or recent communication usage or communication behavior of the mobile communication device 102 to the associated mean or average communication usage or communication behavior of the mobile communication device 102. When the recent or current communication usage or communication behavior of the mobile communication device 102 deviates significantly from the associated average or mean, the guardian mobile application 106 may trigger a variety of precautionary and/or remediating actions. In an embodiment, a "significant deviation" may be defined as communication usage that differs from a mean or average communication usage or communication pattern by more than a predefined threshold, either positively or negatively. In an embodiment, a "significant deviation" may be defined as communication usage that differs from a mean or average communication usage or communication pattern by more than a threshold portion of a standard deviation.

For example, sending text messages out at a rate that exceeds the average or mean hourly texting rate by more than a single standard deviation may act as a trigger. Alternatively, the triggering threshold may be defined as 2 standard deviations or some other appropriate threshold. Different communication modes may be associated with different triggering thresholds. The guardian mobile application 106 may periodically compare the current or recent communication usage to the associated average or mean communication usage, for example every 5 minutes, every 15 minutes, every hour, or at some other periodic interval. Alternatively, the guardian mobile application 106 may compare the current or recent communication usage to the associated averages or means after a predefined number of invocations of each communication application 108. For example, in an embodiment, the text messaging usage may be compared to the average or mean frequency of text messaging after each transmission of 10 texts. Thus, the comparison of usage to averages or means of each communication application 108 may be performed at different times, as triggered by the usage of the subject communication application 108.

When triggered, the guardian mobile application 106 may present a notification of the deviant communication usage to the user of the mobile communication device 102. The guardian mobile application 106 may pause the subject communication application 108 until a user of the mobile communication device 102 provides an input acknowledging and approving the communication usage. For example, in an embodiment, the guardian mobile application 106 may present a query or dialog box to the user of the mobile communication device 102 to ask the user if he or she wants to continue the communication that differs from the communication usage pattern. The guardian mobile application 106 may require the user to input a personal identification number (PIN) or password before releasing the pause on the subject communication application 108. When triggered, the guardian mobile application 106 may disable all non-trusted applications 110, at least temporarily. Alternatively, the guardian mobile application 106 may disable a selected non-trusted application 110, for example a non-trusted application 110 that had recently been invoking the application programming interface of the subject communication application 108. A disabled or paused communication application 108 or non-trusted application 110 may remain paused or disabled until a message is received from a guardian network application 118 executing on a network server 116 coupled to the network 114, for example a network server 116 operated by a wireless service provider. In an embodiment, any of the above actions may be referred to as blocking at least one attempt to initiate communication by the mobile communication device 102.

In embodiment, the guardian mobile application 106 may monitor activity such as entering and exiting special operation modes of the mobile communication device 102, for example an airplane mode or a power-off mode. If the guardian mobile application 106 identifies a deviant and/or abnormal pattern of special operation mode transitions, the guardian mobile application 106 may take precautionary or corrective action. For example, the guardian mobile application 106 may delay a transition out of airplane mode, for example delaying transition out of airplane mode by 15 seconds, 1 minute, 5 minutes, or minutes. The time delay for performing the transition may be determined as a random time delay within a range of possible time delays. A random offset from a minimum time delay may be calculated based on a randomizing seed value such as an equipment identification number (EID) associated with the device 102, a dialable number associated with the device 102, a street number associated with a user of the device 102, an age of a user associated with the device 102, or some other seed value.

Deviant and/or abnormal patterns of special operation mode transitions may be defined as a repetition of the subject transition within a predefined period of time. For example, powering-off the mobile communication device 102 twice within 5 minutes or less may be defined as a trigger. Alternatively, powering-off the device 102 three times within 5 minutes or less may be defined as a trigger. Alternatively, powering-on the device 102 twice within 5 minutes or less may be defined as a trigger. Alternatively powering on the device 102 three times within 5 minutes may be defined as a trigger. Other predefined time periods may also be used, for example 10 minutes, 15 minutes, 60 minutes, or another time period.

The guardian mobile application 106 may send messages to the guardian network application 118 reporting any deviations of communication usage from the normal usage pattern or unusual operation mode transition patterns of the mobile communication device 102. These reports may include supporting information such as values of the average, the mean, and the standard deviation of the recent communication usage from the usage pattern of the subject communication application 108 on the mobile communication device 102. These reports may include the current deviant usage value of the subject communication application 108.

The guardian network application 118 may send messages requesting or commanding the guardian mobile application 106 on the mobile communication device 102 to take remedial action. The remedial action may comprise modifying a communication activity of the mobile communication device 102. The remedial action may comprise disabling all non-trusted applications 110. The remedial action may comprise pausing one or more communication applications 108. In an embodiment, the guardian network application 118 may analyze reports from the guardian mobile application 106 executing on a plurality of mobile communication devices 102 and determine remedial actions based on this analysis. Based on this analysis, the guardian network application 118 may send messages to undertake remedial action to the guardian mobile application 106 executing on the mobile communication devices 102 that reported their anomalous communication usage as well as to send messages to undertake remedial action to the guardian mobile application 106 executing on other mobile communication device 102 that have not reported detecting anomalous communication usage.

In an embodiment, the guardian network application 118 may monitor communications between the mobile communication devices 102 and the radio access network, for example the base transceiver stations 112, and determine a communication usage pattern of the devices 102. The guardian network application 118 may monitor these communications by accessing and analyzing logs, records, call detail records (CDRs), or other data stored in the network 114. The communication usage pattern of the devices 102 may be determined as statistical means and averages of communication usage and as standard deviations related to those means and/or averages. In this case, the means and averages may be calculated across a plurality of mobile electronic devices 102 and hence may comprise a kind of aggregate means, averages, and standard deviations.

The guardian network application 118 may further determine recent communication usage of at least some of the mobile communication devices 102, for example communication usage of the radio access network by the devices 102. When the guardian network application 118 determines that recent communication usage deviates from the communication usage pattern by more than a predefined amount, the guardian network application 118 may send messages to at least some of the mobile communication devices 102 requesting the devices 102 to take remedial action.

Figure 2:
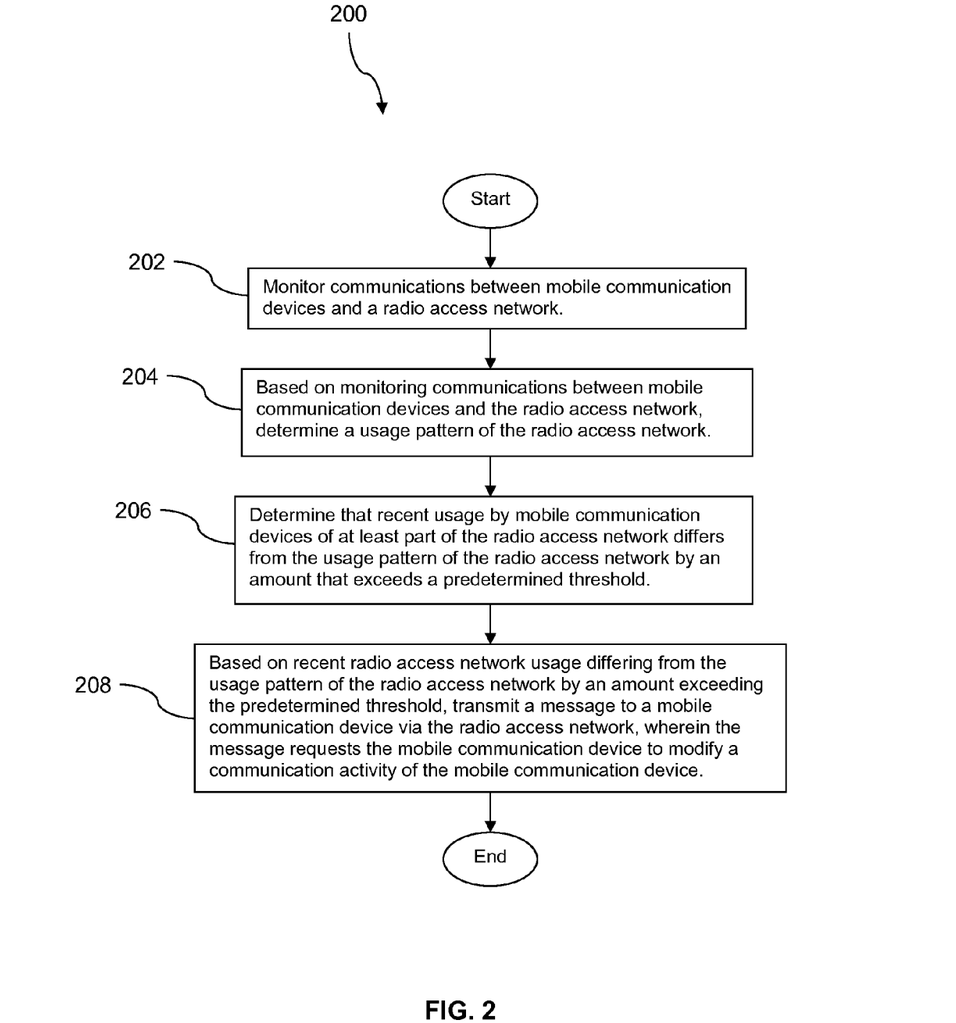
FIG. 2 is a flow chart illustrating a method according to an embodiment of the disclosure.

Turning now to FIG. 2, a method 200 is described. At block 202, communications between mobile communication devices and a radio access network are monitored. For example, the guardian network application 118 monitors mobile communications activities of a plurality of the mobile communication devices 102. In an embodiment, the guardian network application 118 may monitor the communication activities of the mobile communication devices 102 at least in part by accessing logs, records, call detail records, and other data stored in data stores within the network 114.

At block 204, based on monitoring communications between mobile communication devices and the radio access network, a usage pattern of the communications between the mobile communication devices and the radio access network is determined. For example, the guardian network application 118 determines a usage pattern of the mobile communication devices 102 using the radio access network provided by the base transceiver stations 112. The usage patterns may be articulated as means, averages, and standard deviations from the means or averages of usage and frequency of usage of different communication applications 108 of the mobile communication devices 102. The usage patterns may be further defined as means, averages, and standard deviations from the means or averages of usage of operation modes of mobile communication devices 102.

At block 206, the recent usage of at least part of the radio access network by at least some of the mobile communication devices 102 is determined to differ from the usage pattern of the radio access network by an amount that exceeds a predetermined threshold. At block 208, based on the abnormal recent usage a message is transmitted to one or more mobile communication devices 102 via the base transceiver station 112, where the message requests the one or more mobile communication devices 102 to modify a communication activity of the one or more mobile communication devices 102. For example, the message may request the mobile communication devices 102 to pause use of the short message service communication application 108 until further notice. In an embodiment, the guardian network application 118 may perform the method 200. The message may request the mobile communication devices 102 to turn off one or more non-trusted application 110 and/or turn off one or more communication application 108. For example, the message may request the devices 102 to discontinue sending short message service (text) messages and/or multimedia message service messages.

In an embodiment, the guardian network application 118 may be able to localize the abnormal communication usage to a local area, to a specific communication application 108, to a specific non-trusted application 110, to a specific release or version of a specific communication application 108, and/or to a specific release or version of a specific non-trusted application 110. In this case, the message may be targeted to those devices 102 associated with the subject local area, subject communication application 108, and/or subject non-trusted application 110. Additionally, the guardian network application 118 may be able to localize the abnormal communication usage to a specific model of mobile communication device 102 and restrict the messages requesting modified communication activity to those subject mobile communication devices 102 (e.g., those mobile communication devices 102 that happen to be that specific model of device).

Figure 3:
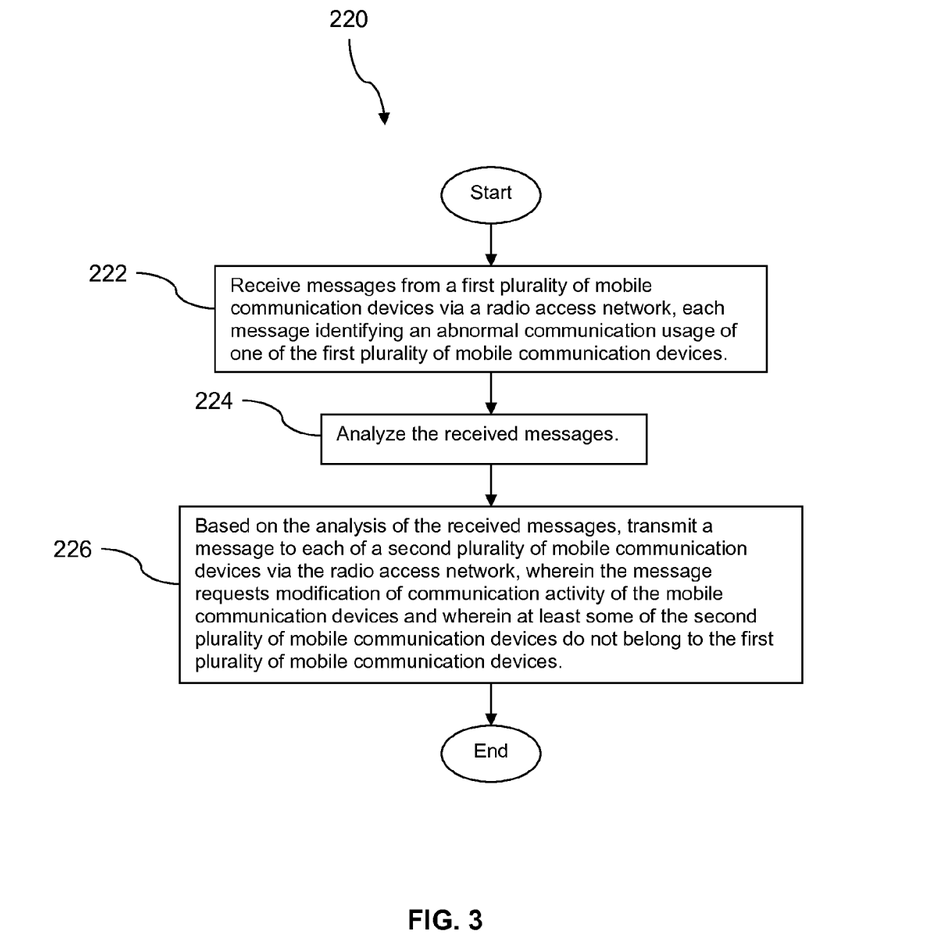
FIG. 3 is a flow chart illustrating another method according to an embodiment of the disclosure.

Turning now to FIG. 3, a method 220 is described. At block 222, messages are received from a first plurality of mobile communication devices via a radio access network, for example via the base transceiver stations 112, each message identifying an abnormal communication usage of one of the first plurality of mobile communication devices. The abnormal communication usage constitutes a recent communication usage of the subject devices that deviates more than a threshold amount from a mean or average communication usage of the subject device. It is to be noted that each of the first plurality of mobile communication devices may have determined different usage patterns, for example different values of means and averages of communication usage, based on the specific usage of each subject device. At block 224, the received messages are analyzed by the guardian network application 118.

At block 226, based on the analysis of the received messages, the guardian network application 118 transmits a message to each of a second plurality of mobile communication devices via the radio access network, for example via the base transceiver stations 112, wherein the message requests modification of communication activity of the second plurality of mobile communication devices and wherein at least some of the second plurality of mobile communication devices do not belong to the first plurality of mobile communication devices.

For example, some of the mobile communication devices 102 may have higher mean communication values defined due to the usage pattern of those users, and a commonly distributed virus may be present on these devices too but the usage level on these devices does not yet exceed the relatively higher mean of those communication devices 102. Thus, to some extent, those mobile communication devices 102 that happen to have low means or averages of communication usage may function, to some extent, as "canaries in the mine" when a software bug or a malware is introduced into a plurality of devices 102. These mobile communication devices 102 may detect abnormal communication usage first, report this abnormal usage to the guardian network application 118, and the guardian network application 118 may take precautionary and/or remedial action before the other devices 102 exceed their communication usage thresholds. In an embodiment, in response to the messages received from the first plurality of mobile communication devices 102, the guardian network application 118 may send out messages to the second plurality of mobile devices 102 requesting that they reduce their deviation thresholds at least temporarily.

The second plurality of mobile devices 102 may share some characteristic with the first plurality of mobile devices 102 that is relevant to wireless communication in the radio access network. The shared characteristic may be location in a common local area, such as a specific metropolitan area. The shared characteristic may be a common model of mobile communication device. The shared characteristic may be a common revision or release number of a communication application or a non-trusted application.

Figure 4:
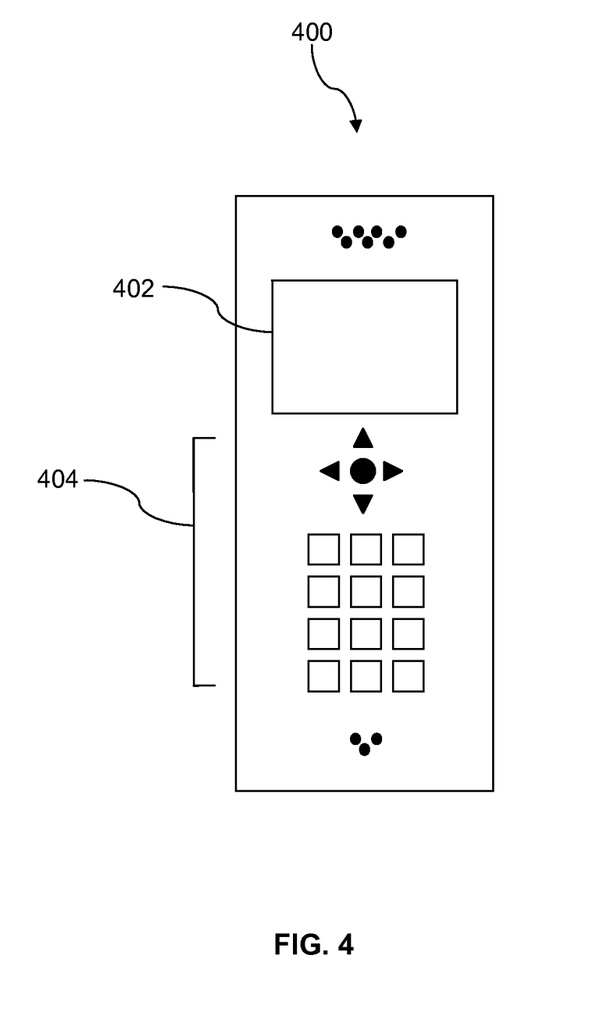
FIG. 4 is an illustration of a mobile communication device according to an embodiment of the disclosure.

FIG. 4 shows a wireless communications system including the mobile device 400. FIG. 4 depicts the mobile device 400, which is operable for implementing aspects of the present disclosure, but the present disclosure should not be limited to these implementations. Though illustrated as a mobile phone, the mobile device 400 may take various forms including a wireless handset, a pager, a personal digital assistant (PDA), a gaming device, or a media player. The mobile device 400 includes a display 402 and a touch-sensitive surface and/or keys 404 for input by a user. The mobile device 400 may present options for the user to select, controls for the user to actuate, and/or cursors or other indicators for the user to direct. The mobile device 400 may further accept data entry from the user, including numbers to dial or various parameter values for configuring the operation of the handset. The mobile device 400 may further execute one or more software or firmware applications in response to user commands. These applications may configure the mobile device 400 to perform various customized functions in response to user interaction. Additionally, the mobile device 400 may be programmed and/or configured over-the-air, for example from a wireless base station, a wireless access point, or a peer mobile device 400. The mobile device 400 may execute a web browser application which enables the display 402 to show a web page. The web page may be obtained via wireless communications with a base transceiver station, a wireless network access node, a peer mobile device 400 or any other wireless communication network or system.

Figure 5:
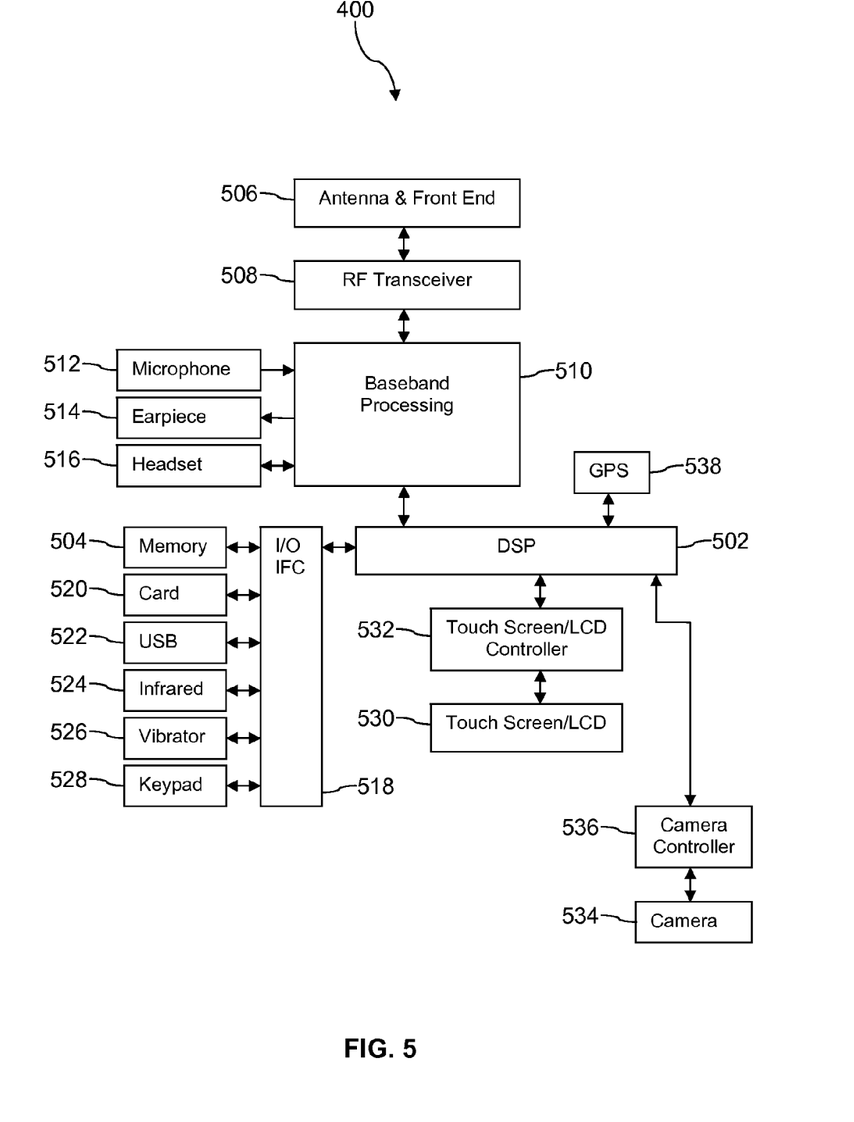
FIG. 5 is a block diagram of a mobile communication device according to an embodiment of the disclosure.

FIG. 5 shows a block diagram of the mobile device 400. While a variety of known components of handsets are depicted, in an embodiment a subset of the listed components and/or additional components not listed may be included in the mobile device 400. The mobile device 400 includes a digital signal processor (DSP) 502 and a memory 504. As shown, the mobile device 400 may further include an antenna and front end unit 506, a radio frequency (RF) transceiver 508, a baseband processing unit 510, a microphone 512, an earpiece speaker 514, a headset port 516, an input/output interface 518, a removable memory card 520, a universal serial bus (USB) port 522, an infrared port 524, a vibrator 526, a keypad 528, a touch screen liquid crystal display (LCD) with a touch sensitive surface 530, a touch screen/LCD controller 532, a camera 534, a camera controller 536, and a global positioning system (GPS) receiver 538. In an embodiment, the mobile device 400 may include another kind of display that does not provide a touch sensitive screen. In an embodiment, the DSP 502 may communicate directly with the memory 504 without passing through the input/output interface 518. Additionally, in an embodiment, the mobile device 400 may comprise other peripheral devices that provide other functionality.

The DSP 502 or some other form of controller or central processing unit operates to control the various components of the mobile device 400 in accordance with embedded software or firmware stored in memory 504 or stored in memory contained within the DSP 502 itself. In addition to the embedded software or firmware, the DSP 502 may execute other applications stored in the memory 504 or made available via information carrier media such as portable data storage media like the removable memory card 520 or via wired or wireless network communications. The application software may comprise a compiled set of machine-readable instructions that configure the DSP 502 to provide the desired functionality, or the application software may be high-level software instructions to be processed by an interpreter or compiler to indirectly configure the DSP 502.

The DSP 502 may communicate with a wireless network via the analog baseband processing unit 510. In some embodiments, the communication may provide Internet connectivity, enabling a user to gain access to content on the Internet and to send and receive e-mail or text messages. The input/output interface 518 interconnects the DSP 502 and various memories and interfaces. The memory 504 and the removable memory card 520 may provide software and data to configure the operation of the DSP 502. Among the interfaces may be the USB port 522 and the infrared port 524. The USB port 522 may enable the mobile device 400 to function as a peripheral device to exchange information with a personal computer or other computer system. The infrared port 524 and other optional ports such as a Bluetooth® interface or an IEEE 802.11 compliant wireless interface may enable the mobile device 400 to communicate wirelessly with other nearby handsets and/or wireless base stations.

The keypad 528 couples to the DSP 502 via the interface 518 to provide one mechanism for the user to make selections, enter information, and otherwise provide input to the mobile device 400. Another input mechanism may be the touch screen LCD 530, which may also display text and/or graphics to the user. The touch screen LCD controller 532 couples the DSP 502 to the touch screen LCD 530. The GPS receiver 538 is coupled to the DSP 502 to decode global positioning system signals, thereby enabling the mobile device 400 to determine its position.

Figure 6A:
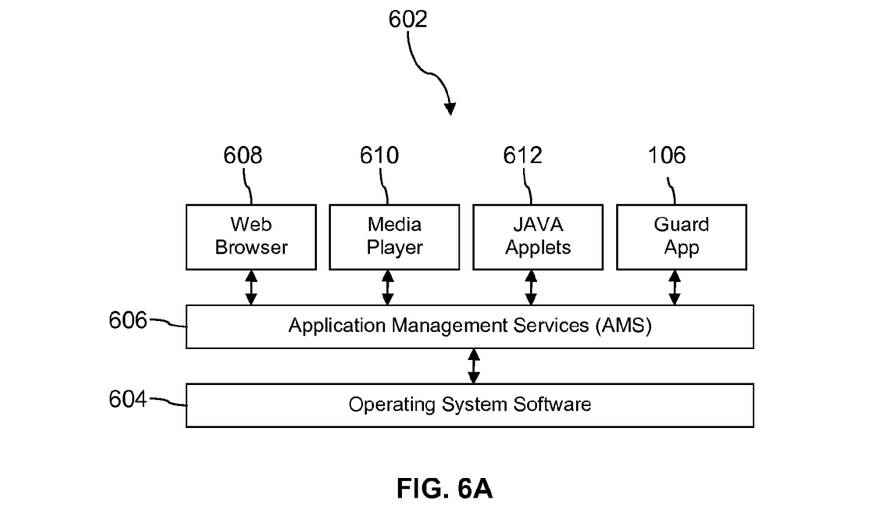
FIG. 6A is a block diagram of a software architecture of a mobile communication device according to an embodiment of the disclosure.

FIG. 6A illustrates a software environment 602 that may be implemented by the DSP 502. The DSP 502 executes operating system software 604 that provides a platform from which the rest of the software operates. The operating system software 604 may provide a variety of drivers for the handset hardware with standardized interfaces that are accessible to application software. The operating system software 604 may be coupled to and interact with application management services (AMS) 606 that transfer control between applications running on the mobile device 400. Also shown in FIG. 6A are a web browser application 608, a media player application 610, JAVA applets 612, and the guardian mobile application 106. The web browser application 608 may be executed by the mobile device 400 to browse content and/or the Internet, for example when the mobile device 400 is coupled to a network via a wireless link. The web browser application 608 may permit a user to enter information into forms and select links to retrieve and view web pages. The media player application 610 may be executed by the mobile device 400 to play audio or audiovisual media. The JAVA applets 612 may be executed by the mobile device 400 to provide a variety of functionality including games, utilities, and other functionality. The guardian mobile application 106 is described above.

Figure 6B:
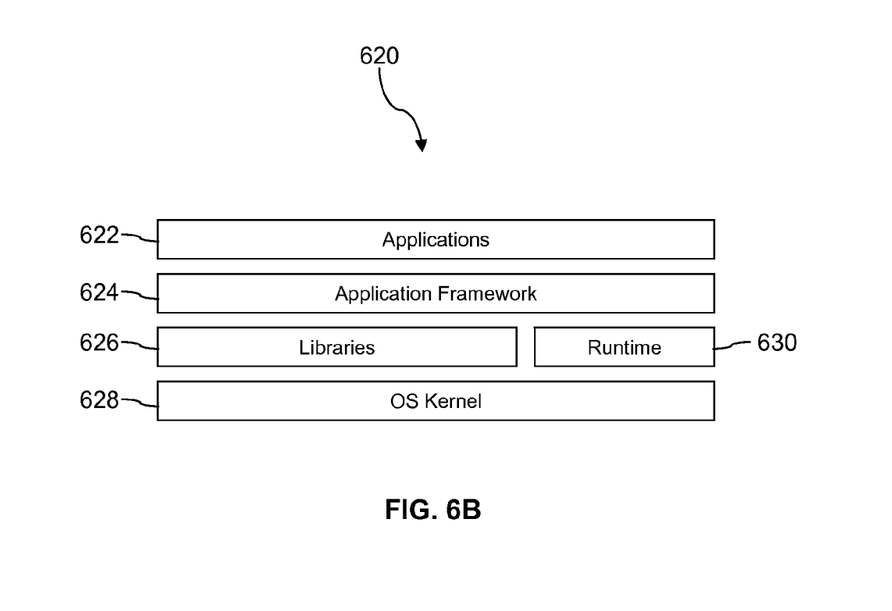
FIG. 6B is a block diagram of another software architecture of a mobile communication device according to an embodiment of the disclosure.

FIG. 6B illustrates an alternative software environment 620 that may be implemented by the DSP 502. The DSP 502 executes operating system software 628 and an execution runtime 630. The DSP 502 executes applications 622 that may execute in the execution runtime 630 and may rely upon services provided by the application framework 624. Applications 622 and the application framework 624 may rely upon functionality provided via the libraries 626. The guardian mobile application 106 described above may be among the applications 622.

Figure 7:
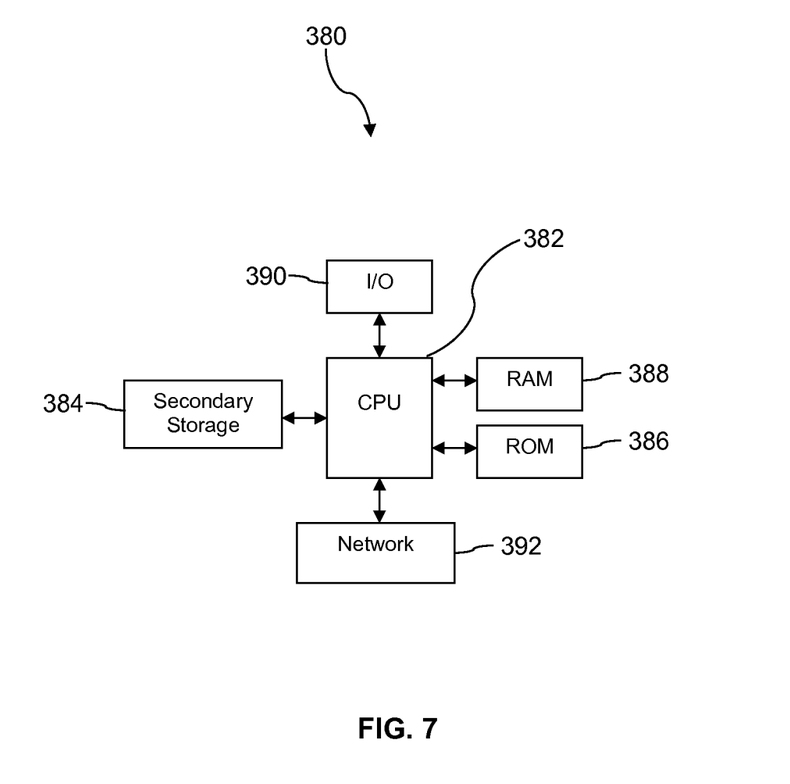
FIG. 7 is a block diagram of a computer system according to an embodiment of the disclosure.

FIG. 7 illustrates a computer system 380 suitable for implementing one or more embodiments disclosed herein. The computer system 380 includes a processor 382 (which may be referred to as a central processor unit or CPU) that is in communication with memory devices including secondary storage 384, read only memory (ROM) 386, random access memory (RAM) 388, input/output (I/O) devices 390, and network connectivity devices 392. The processor 382 may be implemented as one or more CPU chips.

It is understood that by programming and/or loading executable instructions onto the computer system 380, at least one of the CPU 382, the RAM 388, and the ROM 386 are changed, transforming the computer system 380 in part into a particular machine or apparatus having the novel functionality taught by the present disclosure. It is fundamental to the electrical engineering and software engineering arts that functionality that can be implemented by loading executable software into a computer can be converted to a hardware implementation by well known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

The secondary storage 384 is typically comprised of one or more disk drives or tape drives and is used for non-volatile storage of data and as an over-flow data storage device if RAM 388 is not large enough to hold all working data. Secondary storage 384 may be used to store programs which are loaded into RAM 388 when such programs are selected for execution. The ROM 386 is used to store instructions and perhaps data which are read during program execution. ROM 386 is a non-volatile memory device which typically has a small memory capacity relative to the larger memory capacity of secondary storage 384. The RAM 388 is used to store volatile data and perhaps to store instructions. Access to both ROM 386 and RAM 388 is typically faster than to secondary storage 384. The secondary storage 384, the RAM 388, and/or the ROM 386 may be referred to in some contexts as computer readable storage media and/or non-transitory computer readable media.

I/O devices 390 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 392 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards such as code division multiple access (CDMA), global system for mobile communications (GSM), long-term evolution (LTE), worldwide interoperability for microwave access (WiMAX), and/or other air interface protocol radio transceiver cards, and other well-known network devices. These network connectivity devices 392 may enable the processor 382 to communicate with the Internet or one or more intranets. With such a network connection, it is contemplated that the processor 382 might receive information from the network, or might output information to the network in the course of performing the above-described method steps. Such information, which is often represented as a sequence of instructions to be executed using processor 382, may be received from and outputted to the network, for example, in the form of a computer data signal embodied in a carrier wave.

Such information, which may include data or instructions to be executed using processor 382 for example, may be received from and outputted to the network, for example, in the form of a computer data baseband signal or signal embodied in a carrier wave. The baseband signal or signal embedded in the carrier wave, or other types of signals currently used or hereafter developed, may be generated according to several methods well known to one skilled in the art. The baseband signal and/or signal embedded in the carrier wave may be referred to in some contexts as a transitory signal.

The processor 382 executes instructions, codes, computer programs, scripts which it accesses from hard disk, floppy disk, optical disk (these various disk based systems may all be considered secondary storage 384), ROM 386, RAM 388, or the network connectivity devices 392. While only one processor 382 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 384, for example, hard drives, floppy disks, optical disks, and/or other device, the ROM 386, and/or the RAM 388 may be referred to in some contexts as non-transitory instructions and/or non-transitory information.

In an embodiment, the computer system 380 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 380 to provide the functionality of a number of servers that is not directly bound to the number of computers in the computer system 380. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider.

In an embodiment, some or all of the functionality disclosed above may be provided as a computer program product. The computer program product may comprise one or more computer readable storage medium having computer usable program code embodied therein to implement the functionality disclosed above. The computer program product may comprise data structures, executable instructions, and other computer usable program code. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 380, at least portions of the contents of the computer program product to the secondary storage 384, to the ROM 386, to the RAM 388, and/or to other non-volatile memory and volatile memory of the computer system 380. The processor 382 may process the executable instructions and/or data structures in part by directly accessing the computer program product, for example by reading from a CD-ROM disk inserted into a disk drive peripheral of the computer system 380. Alternatively, the processor 382 may process the executable instructions and/or data structures by remotely accessing the computer program product, for example by downloading the executable instructions and/or data structures from a remote server through the network connectivity devices 392. The computer program product may comprise instructions that promote the loading and/or copying of data, data structures, files, and/or executable instructions to the secondary storage 384, to the ROM 386, to the RAM 388, and/or to other non-volatile memory and volatile memory of the computer system 380.

In some contexts, the secondary storage 384, the ROM 386, and the RAM 388 may be referred to as a non-transitory computer readable medium or a computer readable storage media. A dynamic RAM embodiment of the RAM 388, likewise, may be referred to as a non-transitory computer readable medium in that while the dynamic RAM receives electrical power and is operated in accordance with its design, for example during a period of time during which the computer 380 is turned on and operational, the dynamic RAM stores information that is written to it. Similarly, the processor 382 may comprise an internal RAM, an internal ROM, a cache memory, and/or other internal non-transitory storage blocks, sections, or components that may be referred to in some contexts as non-transitory computer readable media or computer readable storage media.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A mobile communication device, comprising:
   a radio transceiver to communicatively couple the mobile communication device to a radio access network by a wireless communication link;
   a memory;
   a processor; and
   an application stored in the memory that, when executed by the processor,
      builds a communication history of the mobile communication device, wherein the communication history comprises communication usage of the mobile communication device,
      analyzes the communication history of the mobile communication device to determine a pattern of communication usage expectations of the mobile communication device,
      monitors recent communication usage of the mobile communication device,
      compares the recent communication usage of the mobile communication device to the pattern of communication usage expectations of the mobile communication device, and
      when the recent communication usage of the mobile communication device differs from the pattern of communication usage expectations of the mobile communication device by more than a predefined threshold beyond the pattern of communication usage expectations, blocks at least one attempt to initiate communication by an identified application on the mobile communication device by disabling the identified application.

2. The mobile communication device of claim 1, wherein the mobile communication device is one of a mobile phone, a personal digital assistant, a wireless enabled computer, or a media player.

3. The mobile communication device of claim 1, wherein the radio transceiver establishes a wireless communication link with the radio access network according to a code division multiple access (CDMA) wireless communication protocol, a global system for mobile communication (GSM) wireless communication protocol, a long-term evolution (LTE) wireless communication protocol, or a world-wide interoperability for microwave access (WiMAX) wireless communication protocol.

4. The mobile communication device of claim 1, wherein determining a pattern of communication usage expectations of the mobile communication device comprises determining a statistical mean or average and a statistical standard deviation of a communication usage of the mobile communication device and wherein the predefined threshold is defined in terms of the statistical standard deviation of the communication usage.

5. The mobile communication device of claim 1, wherein when the recent communication usage expectations of the mobile communication device differs from the pattern of communication usage of the mobile communication device by more than a predefined threshold, the application presents a notification to the user of the mobile communication device about the communication usage that differs from the pattern of communication usage expectations of the mobile communication device.

6. The mobile communication device of claim 5, wherein the application further presents a query to the user of the mobile communication device to ask if the user wants to continue with the communication usage that differs from the pattern of communication usage expectations of the mobile communication device.

7. The mobile communication device of claim 1, wherein when the recent communication usage of the mobile communication device differs from the pattern of communication usage expectations of the mobile communication device by more than a predefined threshold, the application transmits a message via the radio transceiver to the radio access network reporting the communication usage of the mobile communication device that differs from the pattern of communication usage expectations of the mobile communication device.

8. The mobile communication device of claim 1, wherein the application delays the mobile communication device exiting from an airplane mode of operation of the mobile communication device when the application detects a repetition of exiting from the airplane mode of operation by the mobile communication device within a predefined period of time.

9. The mobile communication device of claim 8, wherein the delay of exiting from the airplane mode of operation is a randomized time delay.

10. The method of claim 1, wherein the at least one attempt to initiate communication by the mobile communication device is made by a non-trusted application stored in the mobile communication device.

11. The method of claim 10, wherein the non-trusted application is installed by a user after the mobile communication device is sold to the user.

12. A method of managing a radio access network, comprising:
    monitoring communications between at least one mobile communication devices and a radio access network, wherein monitoring communications between the mobile communication devices and the radio access network comprises monitoring communication usage history between at least one mobile communication device and the radio access network;
    based on monitoring communication usage history between the at least one mobile communication device and the radio access network, determining an expected communication usage pattern of the radio access network;
    determining that recent usage by the at least one mobile communication device of at least part of the radio access network differs from the expected communication usage pattern of the radio access network by an amount that exceeds a predetermined threshold; and based on recent radio access network usage differing from the expected communication usage pattern of the radio access network by an amount exceeding the predetermined threshold beyond the expected communication usage pattern, transmitting a message to the at least one mobile communication device via the radio access network, wherein the message requests the at least one mobile communication device to modify a communication activity of the mobile communication device, and wherein the message transmitted to the at least one mobile communication device identifies an application installed on the at least one mobile communication and requests the at least one mobile communication device to turn off the identified application.

13. The method of claim 12, wherein the message transmitted to the at least one mobile communication device requests the at least one mobile communication device to turn off all non-trusted applications installed on the at least one mobile communication device.

14. The method of claim 12, wherein the message transmitted to the at least one mobile communication device requests the at least one mobile communication device to discontinue sending short message system (SMS) messages or to discontinue sending multimedia message system (MMS) messages.

15. The method of claim 12, further comprising, based on recent radio access network usage differing from the expected usage pattern of the radio access network by an amount exceeding the predetermined threshold, transmitting a message to a plurality of mobile communication devices via the radio access network, wherein the message requests the plurality of mobile communication devices to modify a communication activity, wherein the plurality of mobile communication devices are located in the same area, wherein the plurality of mobile communication devices are the same model of device, and wherein the plurality of mobile communication devices have installed the same version of an application.

16. The method of claim 12, wherein the application installed on the at least one mobile communication device is a non-trusted application.

17. The method of claim 16, wherein the non-trusted application is at least one of provided by a third party developer not subject to at least one of design standards or quality control standards defined by a wireless service provider or freeware.

* * * * *